United States Patent [19]
Graeff

[11] Patent Number: 5,688,305
[45] Date of Patent: Nov. 18, 1997

[54] METHOD AND DEVICE FOR DRYING OF MOIST GASES

[76] Inventor: Roderich Wilhelm Graeff, Kollwitzweg 19, 62291 Darmstadt, Germany

[21] Appl. No.: 546,115

[22] Filed: Oct. 20, 1995

[30] Foreign Application Priority Data

Oct. 20, 1994 [DE] Germany ............ 44 37 494.1

[51] Int. Cl.$^6$ ............ B01D 53/06; B01D 53/26
[52] U.S. Cl. ............ 95/14; 95/18; 95/113; 95/125; 95/126; 96/112; 96/125; 96/130; 96/150
[58] Field of Search ............ 95/14, 17, 18, 95/107, 113, 117, 121–126; 96/112, 123, 125, 130, 150

[56] References Cited

U.S. PATENT DOCUMENTS

| 3,009,540 | 11/1961 | Munters | 95/113 |
|---|---|---|---|
| 3,222,849 | 12/1965 | Fischer | 96/112 |
| 3,241,294 | 3/1966 | Walker et al. | 95/17 |
| 3,243,938 | 4/1966 | Lavery et al. | 95/17 |
| 3,708,956 | 1/1973 | Norbäck | 95/113 X |
| 4,509,272 | 4/1985 | Gräff | 34/27 |
| 4,656,757 | 4/1987 | Oschmann | 95/18 X |
| 4,729,774 | 3/1988 | Cohen et al. | 55/181 |
| 4,775,484 | 10/1988 | Schmidt et al. | 95/14 X |
| 4,926,618 | 5/1990 | Ratliff | 55/20 |
| 5,188,645 | 2/1993 | Fukuhori et al. | 95/113 |
| 5,199,964 | 4/1993 | Gräff | 55/20 |
| 5,215,555 | 6/1993 | Gräff | 55/20 |
| 5,271,557 | 12/1993 | Lynch et al. | 95/17 X |
| 5,389,125 | 2/1995 | Thayer et al. | 95/17 X |
| 5,474,594 | 12/1995 | Khelifa et al. | 95/14 |

FOREIGN PATENT DOCUMENTS

| 0 379 975 | 8/1990 | European Pat. Off. . | |
|---|---|---|---|
| 0 398 139 | 11/1990 | European Pat. Off. . | |
| 1 176 335 | 8/1964 | Germany . | |
| 2 126 649 | 11/1972 | Germany . | |
| 23 01 045 | 8/1978 | Germany . | |
| 43 21 863 | 1/1995 | Germany . | |
| 61-167428 | 7/1986 | Japan | 96/125 |
| 0854424 | 8/1981 | U.S.S.R. | 95/17 |

*Primary Examiner*—Robert Spitzer
*Attorney, Agent, or Firm*—Jacobson, Price, Holman & Stern, PLLC

[57] ABSTRACT

A process and an apparatus are described for drying moist gas, in particular air, in which the moisture is removed from the gas by a desiccant and the desiccant is freed of the absorbed moisture by a hot regeneration gas. In order to improve the energy balance in the drying of moist gas, in particular air, it is provided that the throughput of regeneration gas through the desiccant is controlled as a function of the temperature of the regeneration gas leaving the desiccant. An apparatus suitable for carrying out the process contains a temperature sensor arranged in the regeneration exhaust gas stream, which temperature sensor controls a device determining the regeneration gas throughput through the desiccant.

21 Claims, 2 Drawing Sheets

METHOD AND DEVICE FOR DRYING OF MOIST GASES

The invention relates to a process for drying moist gas, in particular air, in which the moisture is removed from the gas by a desiccant and the desiccant is freed of the absorbed moisture by a hot regeneration gas, and to an apparatus for carrying out the process.

In U.S. Pat. No. 4,509,272, a process for drying plastic granules is described, in which hot dry air flowing through the granules removes the moisture from the granules. The moist exhaust air from the granule drying is then passed through a desiccant, usually a molecular sieve or a mixture thereof with silica gel, which removes by adsorption the moisture entrained by the moist exhaust air from the granules. When the desiccant is saturated with moisture, it is subjected to regeneration, in which hot regeneration gas is passed through the desiccant. The hot regeneration gas evaporates the water contained in the desiccant and the regeneration exhaust gas carries along the water vapor to the outside. After the regeneration has been completed, that is when the desiccant is dry again, moist air, that is the exhaust air from the granule hopper, is passed again through the desiccant.

This drying of the moist exhaust air operates highly efficiently under full load, i.e. when the moisture content of the air to be dried corresponds to the maximum value for which the plant has been optimally designed, i.e., inter alia having the lowest energy consumption and a sufficiently good dew point of the dried air. However, the energy balance is impaired if the water load of the air to be dried is lower than the full load. That is, it is observed that in this case the desiccant at the end of the regeneration phase has a considerably higher temperature than under full load and therefore a greater expenditure on cooling must be made to cool the desiccant to a temperature which enables the desiccant to adsorb moisture from the air to be dried. The cooling device for the freshly regenerated desiccant must therefore be designed to be greater than would be necessary under full load. Under partial load, heat energy is therefore lost owing to excessive heating of the desiccant. On the other hand, the amount of heat released by the regeneration gas in the desiccant is necessary for the full-load operation of air drying.

Therefore the object underlying the invention is to improve the energy balance in the drying of moist gas, in particular air.

For this purpose, the invention proposes in the process mentioned at the outset to control the throughput of regeneration gas through the desiccant as a function of the temperature of the regeneration gas leaving the desiccant at the end of the regeneration. If, therefore, the temperature of the regeneration gas leaving the desiccant at the end of the regeneration exceeds a value predetermined, for example, by the full load operation, the throughput of the regeneration gas during the following regeneration cycles is decreased until the predetermined value is achieved again. The desiccant, at the end of the next regeneration cycle, then has a temperature which is roughly equal to that at full-load operation, so that no excess heat energy is lost in the cooling of the desiccant. If, on the other hand, the temperature of the regeneration gas leaving the desiccant at the end of a regeneration cycle remains below the predetermined value, the throughput of regeneration gas through the desiccant is increased for the next regeneration cycle in order to ensure that all of the moisture is expelled from the desiccant.

According to another proposal of the invention, to achieve said object, the residence time of the desiccant in the gas stream to be dried is controlled as a function of the rate of the regeneration gas. Whenever the rate of the regeneration gas is decreased, the duration of the next regeneration cycle and thus the resident time of the desiccant in the gas stream to be dried are increased.

The duration of the next regeneration phase is shortened only if the regeneration air rate corresponds to the maximum rate and the temperature of the regeneration gas leaving the desiccant at the end of a regeneration phase is below the predetermined value.

In both variants, the desiccant at the end of a regeneration cycle has a temperature which roughly corresponds to that which it would have under full load. For cooling the desiccant, according to the invention, therefore, full load operation is always simulated with the consequence that the otherwise useless energy expenditure in the partial load operation in heating up the regeneration gas and in cooling the desiccant is avoided and the energy balance of air drying overall is improved.

The combination of the two variants offers a particular advantage, according to which a decrease or increase of the regeneration gas throughput causes an extension or possibly a shortening of the residence time of the desiccant in the regeneration gas stream.

The process according to the invention permits other advantageous developments which are specified in the subclaims. If, for example, the desiccant is moved cyclically, for instance by a rotor, the gas to be dried can be continuously dried and the desiccant can be continuously regenerated, so that the abovementioned regeneration phases can follow one another without interruption.

An apparatus suitable for carrying out the process according to the invention is an apparatus for drying moist gas, in particular air, having a vessel containing a desiccant and having a fan which feeds the moist gas to the desiccant in the vessel, a regeneration gas line for feeding hot regeneration gas to the desiccant and a regeneration exhaust gas line opening out into the open being connected to the vessel and the sensor of a temperature sensor being arranged in the regeneration exhaust gas stream leaving the vessel, the output signal lead of which temperature sensor is connected to a gate electrode of a device controlling the throughput of regeneration gas through the desiccant. This control can expediently be achieved by the output signals of the temperature sensor influencing a valve arranged in the regeneration gas stream to the vessel. Alternatively, the output signals of the temperature sensor can control a fan having controllable rotary speed, which fan feeds the hot regeneration gas to the vessel.

In a further alternative, the output signals of the temperature sensor or the position of the valve or the rotary speed of the fan can control the residence time of the desiccant in the regeneration gas stream.

In an expedient development of the apparatus according to the invention, the vessel is a rotor containing the desiccant whose speed of rotation is controlled by the output signals and by the gas flow area of the valve and to one part of which gas to be dried is continuously fed and to another part of which hot regeneration gas is continuously fed. In the course of one revolution of the rotor, along one peripheral section, moist gas to be dried is fed through the corotating desiccant, along an adjoining further section, hot regeneration gas is fed through the corotating desiccant and along a third section, coolant is fed through the corotating desiccant.

Preferred embodiments of the apparatus according to the invention as, for example, make it suitable also for the use as equipment for drying room air, are specified in further subclaims.

The invention is described in detail below with reference to the implementation examples depicted in the accompanying drawing.

Figure 1:
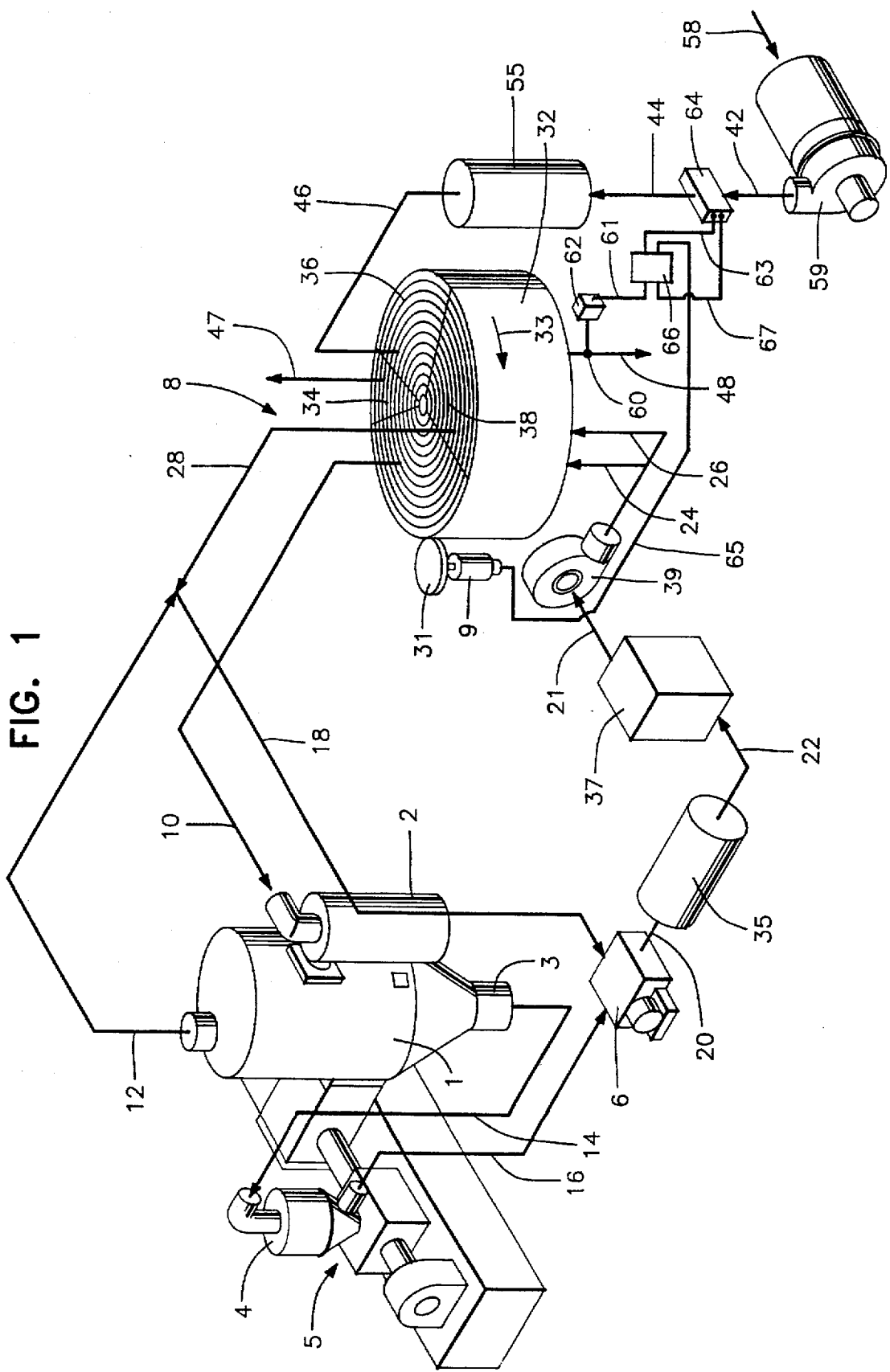
FIG. 1 shows an apparatus for drying moist exhaust air from a drying process for plastic granules.

Plastic granules, not depicted, made of PTFE, for example, and charged into a drying hopper 1 are freed of moisture contained in the granules in a manner such that dry air conducted along an air line 10, after being heated in a heater 2, is introduced into the hopper 1, passes upwards there through the plastic granules and leaves the hopper 1 via an exhaust air line 12. At the lower outlet port 3 of the hopper 1, dried plastic granules are fed by air through the line 14 to a filling hopper 4 which sits on the feed orifice of an extrusion machine designated overall by 5. The filling hopper 4 contains an air separator, not depicted, so that the conveying air can be taken off from this along the line 16 and fed to a valve 6.

As still is to be described in detail below, the moisture-laden exhaust air 12 is conducted through a desiccant contained in a drier 8, which desiccant adsorbs the moisture from the exhaust air which can then be used as dry air via line 10 for continuing the granule drying process. When the desiccant is saturated with moisture, it is subjected to a regeneration in which the hot regeneration air is passed through the desiccant and removes the moisture from this. The dried desiccant can then again dry the exhaust air.

The drier 8 essentially has a rotor 32 driven on its periphery by an electric motor 9 via a friction wheel or pinion 31, which rotor rotates in accordance with arrow 33 clockwise in plan view and for this purpose is appropriately mounted so as to be able to rotate about its axis in bearings which are not depicted. The rotor 32 is filled with a desiccant, for example a molecular sieve. The desiccant in the rotor 32, in the course of the rotation of the rotor 32, passes through three sections 34, 36 and 38, lying sequentially in the peripheral direction. The desiccant which is just in section 34 is used for drying the exhaust air from the line 12; the desiccant which is just passing through the section 36 is dried again by regeneration air; and the desiccant passing through the section 38 is cooled down from the regeneration temperature of the preceding section 36 to a temperature in which the desiccant can adsorb moisture from the exhaust air on entry into the section 34, that is, for example, to about 60° C. when molecular sieve is used as desiccant.

For this purpose, the exhaust air line 12 opens out into a moist air line 18 which leads into the valve 6. The outlet line 20 from the valve 6 conducts the moist exhaust air into a circulation filter 35 whose outlet air line 22 runs via a cooler 37 and an air line 21 into the suction orifice of a fan 39. The moist air stream flowing out of the pressure side of the fan 39 is divided, more precisely, a first moist air stream is fed from below to the section 34 of the rotor 32 via a first moist air line 24. A second moist air line 26 passes moist air into the section 38 of the rotor 32. The ratio of the two air streams is chosen in such a way that the second moist air stream sweeping through the line 26 has a lower throughput in time than the main moist air stream conducted through the line 24. As can be seen from the preceding, the main moist air stream introduced from line 24 into the section 34 of the desiccant is freed from its moisture there and leaves the section 34 on the opposite side of the rotor 32 via the dry air line 10. The moist air stream which is smaller in terms of rate from line 26 serves for cooling the desiccant situated in section 38, scarcely loses its moisture in this (because the desiccant cannot adsorb moisture at the higher temperatures prevailing in section 38) and leaves the section 38 on the opposite side of the rotor 32 through line 28 as a further moist air stream which joins the moist air line 18.

To regenerate the desiccant situated in section 36 during the rotation of the rotor 32, a further fan 59 draws in external air by suction in accordance with arrow 58 and forces it via external-air line 42 through a valve 64. From the outlet orifice of the valve 64, an air line 44 leads to a regeneration heater 55 which brings the air arriving via line 44 to a temperature of, for example, 250° C. when a molecular sieve is used. The regeneration air leaving the regeneration heater 55 reaches the section 36 of the rotor 32 via regeneration line 46. The moisture-laden regeneration exhaust air leaving the outlet line 48 for the section 36 is discharged into the open. As can be seen from the arrangement of the fans 39 and 59, the regeneration air is passed through the desiccant in the section 36 in the opposite direction to the flow direction of the moist air coming from the lines 24 and 26.

The sensor 60 of a temperature sensor 62 is seated in the regeneration exhaust air line 48. The arrangement of the regeneration exhaust air line 48 is made such that it is coupled to the rotor 32 near the end of the section 36, so that the regeneration exhaust air in line 48 essentially originates from a desiccant region which is situated at the end of the regeneration.

An output signal lead 61 from the temperature sensor 62 leads to a first input of a control instrument 66 and an output signal lead 67 feeds signals representative of the size of the flow area of the valve 64 to a second input of the control instrument 66. A first output lead 63 from the control instrument 66 supplies control signals to the valve 64 for controlling its flow area in accordance with the output signals from the temperature sensor 62 on lead 61. A second output lead 65 from the control instrument 66 feeds control signals, as a function of the signals on lead 67, to the motor 9 for controlling its rotary speed. The electromagnetic servo-valve 64 is designed in such a way that it increases or decreases the flow area for the air from the line 42 as a function of the type of the output signals of the temperature sensor 62 offered via lines 61, 63. By this means the throughput of regeneration air from the regeneration line 46 through the section 36 is made dependent on the type of the output signals of the lines 61, 63, that is, on the regeneration exhaust air temperature in line 48 determined by the sensor 60.

Correspondingly, the type of the output signals on the lines 61 and 63 and on a line 65 which connects the servo valve to the electric motor 9 influences the rotary speed of the electric motor 9 and thus the rotary speed of the rotor 32 and thus the residence time of the desiccant in the sections 34, 36 and 38 of the rotor 32.

EXAMPLE

The drier 8 is designed in such a way that at the highest moisture content to be expected in the exhaust air an energy-saving drying of the same is possible in the rotor 32 at a good dew point of eg. −10° C. of the drying area. For this purpose, a defined throughput of regeneration air is necessary through the section 36 which determines the largest opening in the valve 64 and at a regeneration air heated by the heater 55 to 250° C. produces a regeneration exhaust air temperature of about 150° C., at which it can be assumed that all of the moisture is expelled from the desiccant. The relatively slow changes, in accordance with experience, of the moisture content of the air to be dried permit control as follows:

it is assumed that the load to be dried is half as great as that for which the drier 8 is optimally designed. The regeneration exhaust air temperature in the line 48 then increases, because the desiccant is loaded with less moisture, is consequently more rapidly regenerated and therefore the regeneration exhaust air temperature gradually approaches the regeneration air inlet temperature in line 46 (250° C.). The temperature sensor detects this temperature increase and produces output signals on lines 61 and 63 which cause the valve 64 to decrease its flow area in proportion to the regeneration exhaust air temperature increase, to 50% in the example assumed. The same output signals on the leads 61 and 65 also cause the speed of rotation of the motor 9 to be proportionally reduced, in the example therefore, to 50%. If the rotor requires 20 minutes for one revolution at full load, this time period will now increase to 40 minutes. If it is further assumed that the section 34 makes up about one third of the entire rotor area (transversely to its axis of rotation), the molecular sieve as desiccant will usually be situated for 6⅔ minutes in the exhaust air drying process. With the assumed reduction of the rotary speed of the electric motor 9 by 50%, the residence time of the desiccant in the section 34 accordingly increases to 13⅓ minutes. This time period is sufficient for the desiccant to be optimally enriched with moisture in the section 34, despite half the exhaust air moisture load. The regeneration in the section 36 now obviously also lasts for twice as long, but is carried out with half the regeneration air throughput. The latter means that the regeneration heater 55 only has to bring half of the air throughput to the required temperature of 250° C. which leads to a considerable energy saving.

When the moisture load of the exhaust air 12 increases again, the regeneration requirement for the desiccant will increase, so that the temperature of the regeneration exhaust air in line 48 decreases. The output signals on the lines 61, 63 are then of a type such that they cause the valve 64 to increase its flow area until the value of 150° C. is again reached. The rotary speed of the electric motor 9 is only increased again when the valve 64 is completely open and, despite this, the temperature in line 48 falls below 150° C.

The change in the speed of rotation of the rotor can be achieved steplessly or, if the motor 9 is a stepper motor, stepwise by changing the step length or step frequency.

The valve 64 can obviously be arranged in any desired position in the regeneration air streams, that is, for example, it can also be included in the regeneration air line 46 or 48 instead of between the lines 42 and 44.

In addition, it is within the scope of the invention to omit the valve 64 and to control the rotary speed of the fan 59 via the control instrument 66 by the output signals on line 61. The rotary speed of the motor 9 can then be controlled by the control instrument 66 which now receives from the fan 59 control signals which are representative of the rotary speed of the latter. In addition, for example, the air pressure can be measured in the lines 42 and 44. The measured values are fed to the control instrument 66, whose output signals control the rotary speed of the motor. It is advisable, in general, to control the speed of rotation of the motor 9 in proportion to the throughput of regeneration air through one of the lines 42, 44 or 46.

Figure 2:
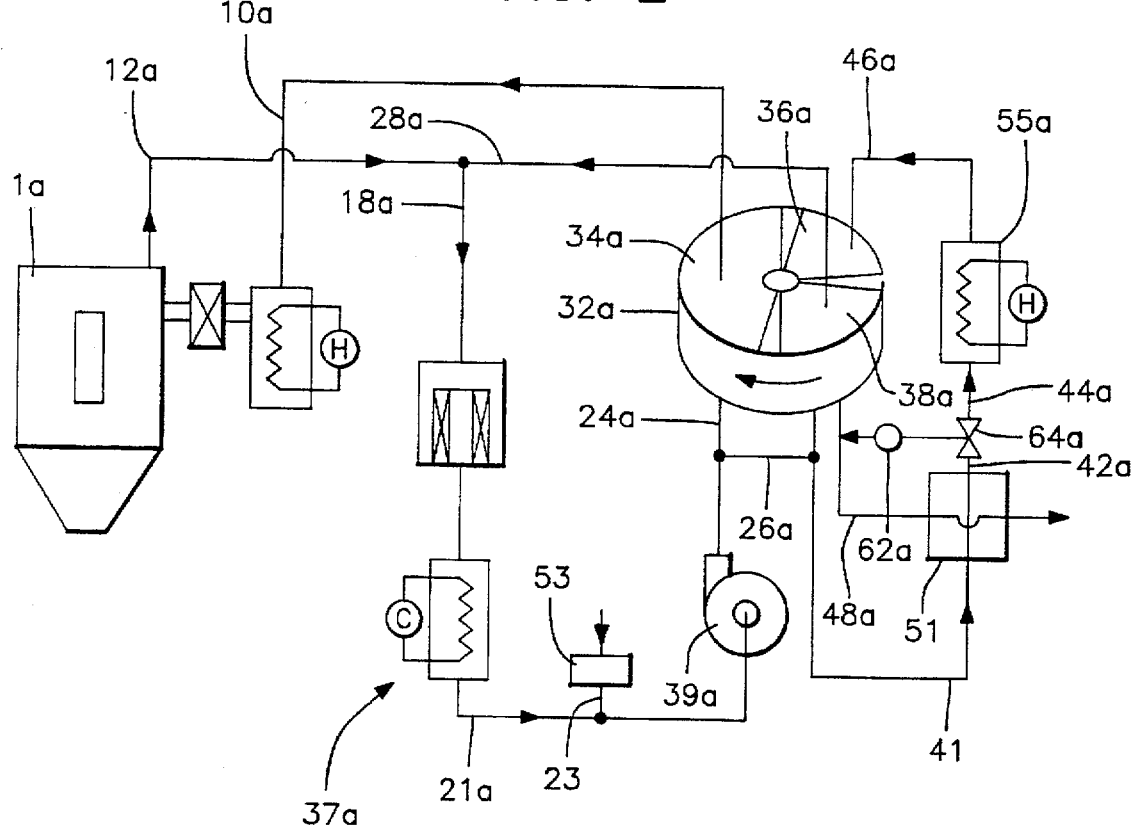
FIG. 2 shows a diagrammatic representation of the apparatus according to FIG. 1, but according to a different embodiment of the invention.

The implementation example of the invention diagrammatically represented in FIG. 2 essentially differs from the above described example by only a single fan 39a being present and the fan 59 being omitted. The components which are identical to the components from FIG. 1 are designated in FIG. 2 with the addition (a). Therefore, only the difference from the above described embodiment is explained below. The control instrument 66 and the controllable drive of the rotor 32a are omitted for simplicity.

An air line 41 which runs through a heat exchanger 51 branches off from the moist air line 26a which runs into the cooling section 38a. On the downstream side of the heat exchanger 51, the air from line 41 is passed to the regeneration heater 55a through line 42a via a valve 64a and a subsequent line 44a, in which regeneration heater the air is brought to a regeneration temperature of, for example, 250° C. On the downstream side of the regeneration heater 55a, the regeneration air line 46a leads to the regeneration section 36a of the rotor 32a. The regeneration exhaust air line 48a from the regeneration section 38a of the rotor 32a again runs through the heat exchanger 51 from this into the open, and releases the heat taken along by it in the heat exchanger 51 to the moist air conducted by the line 41. In the regeneration exhaust air line 48a is seated the sensor of a temperature sensor 62a whose output lead again leads to the control input of the valve 64a.

It is seen that the moist air fed on line 21a from the cooler 37a to the fan 39a, on the pressure side of the fan, is passed for the most part via line 24a through the drying section 34a of the rotor 32a and is fed to the drying hopper 1a again via the dry air line 10a. A smaller part of the moist air leaving the fan 39a serves, via line 26a, to cool the desiccant in the cooling section 36a of the rotor 32a and, downstream of the latter, is fed into the moist air line 18a via line 28a together with the moist exhaust air arriving via line 12a. A third part of the moist air leaving the fan 39a is prepared via a line 41 branching off from the moist air line 26a for the regeneration air in the heat exchanger 51 and in the regeneration heater 55a. The dependence of the volumetric flow rate of regeneration air is again determined as in the preceding example by the open area of the valve 64a which is controlled by the output signals of the temperature sensor 62a.

This embodiment of the invention is not only less complex in terms of apparatus but it also has a still more favorable energy balance, in which the heat entrained by the regeneration exhaust air on line 48a is utilized for preheating the air in line 41 to be prepared for the regeneration air. The regeneration heater 55a can thus be designed smaller. The possibility of preparing the moist air supplied by the fan 39a, by heating it in the heat exchanger 51 and the regeneration heater 55a to produce regeneration air which must have a considerable water absorption capacity is particularly advisable if the moisture carried along by exhaust air via line 12a at full load is far below the dew point of this air.

Since that part of the moist air which is prepared to form the regeneration air is taken off from the air circuit through the granule drier 1a, on the suction side of the fan 39a there is a fresh air intake possibility via an air filter 53 which joins the moist air line 21a via the downstream line 23.

Figure 3:
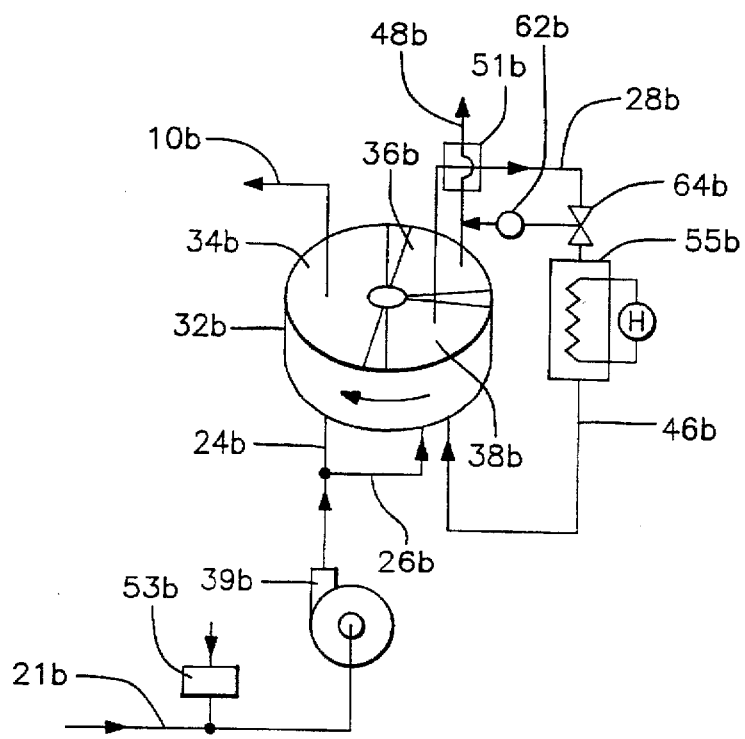
FIG. 3 shows a diagrammatic representation of a third embodiment of the invention which, inter alia, recommends itself for use as equipment for drying a room.

A further implementation example of the invention according to FIG. 3 is suitable not only for drying exhaust air from granule driers but also, as air-conditioning equipment, for dehumidifying room air laden with not excessive moisture. The components which are identical with the components from the implementation examples described above are designated with the addition (b) in the embodiment according to FIG. 3. The control instrument 66 and the controllable motor drive of the rotor 32b are omitted for simplicity.

Air line 21b sucks in the room air and, via the filter 53b, external air and conducts it to the suction orifice of the fan 39b. From its pressure side, a main moist air stream runs via air line 24b through the drier part 34b of a rotor 32b and through the desiccant, for example molecular sieve, contained therein and, after passage through the desiccant, is blown back into the room as dry air via air line 10b.

The branch line 26b from the line 24b runs through the cooling section 38b of the rotor 32b and leaves this via an air line 28b which passes through a heat exchanger 51b. The moist air conducted in line 28b through the desiccant in section 38b and heated there and in the heat exchanger 51b passes via the valve 64b into the regeneration heater 55b in which it is heated to the regeneration temperature. The regeneration line 46b from the regeneration heater 55b is passed through the regeneration section 36b of the rotor 32b where it regenerates the moisture-saturated desiccant and takes along its moisture via regeneration exhaust line 48b through the heat exchanger 51b and blows it out into the exterior air. A temperature sensor 62b is arranged on the regeneration exhaust air line 48b, determines the temperature of the regeneration exhaust air and forms the output signals representative of the temperature determined which are fed as control signals to the valve 64b. The open area of the valve 64b determines the proportion of the moist air which is branched off from the main moist air stream via line 26b and is first used for cooling and then for regeneration of the desiccant.

Although in FIG. 3 it is shown that the regeneration air stream passes through the regeneration section 36b in the same direction as the main moist air stream passes through the desiccant from line 24b, the regeneration line and the regeneration exhaust air line 48b can alternatively, as far as this is in agreement with the implementation examples of the invention described above, be designed in such a way that the regeneration air stream passes through the regeneration section 36b opposite to the direction of flow of the main moist air stream of the desiccant.

I claim:

1. A process for drying a moist gas by first removing moisture from the gas by passing the moist gas through a desiccant, and then freeing said moisture picked up by the desiccant from the moist gas by passing a hot regeneration gas through the desiccant, the process comprising,
   heating the regeneration gas to a predetermined input temperature and inputting the heated regeneration gas to and through the desiccant;
   measuring the temperature of the exhaust regeneration gas that afflues from the desiccant during a last phase of regeneration;
   adjusting the amount of regeneration gas that is input to the desiccant while maintaining the temperature of the inputted regeneration gas at said predetermined input temperature until the temperature of the exhaust regeneration gas reaches a predetermined exhaust gas temperature and continuing the adjusting so as to maintain the temperature of the exhaust regeneration gas at said predetermined exhaust gas temperature.

2. The process of claim 1 wherein the desiccant is moved cyclically and wherein the moist gas is passed through a first section of the cyclically moved desiccant and the regeneration gas is passed through a second section of the cyclically moved desiccant.

3. The process of claim 2 wherein the residence time of the desiccant in the moist gas to be dried is controlled as a function of the temperature of the exhaust regeneration gas leaving the desiccant and as a function of the throughput of the regeneration gas inputted through the desiccant.

4. The process of claim 3 wherein the regeneration gas throughput through the desiccant is decreased when the temperature of the regeneration exhaust gas increases and the residence time of the desiccant in the regeneration gas stream is increased as a function of the decrease in the regeneration gas throughput and in that the regeneration gas throughput is initially increased to a predetermined maximum value when the temperature of the regeneration exhaust gas decreases and the residence time is only reduced when the maximum value is reached.

5. The process of claim 2 wherein said regeneration gas is formed from a part of the moist gas.

6. The process of claim 2 wherein a part of the moist gas is used for cooling the desiccant after its regeneration.

7. The process of claim 6 wherein said part of the moist gas, after the desiccant has been cooled, is used to form said regeneration gas.

8. The process of claim 6 wherein said part of the moist gas, after the desiccant has been cooled, is fed back to the moist gas to be dried.

9. The process of claim 2 wherein said desiccant is a molecular sieve or a silica gel.

10. The process of claim 2 wherein the temperature of the exhaust regeneration gas leaving the desiccant is measured at the end of the regeneration of the desiccant.

11. An apparatus for drying a moist gas comprising:
    a vessel for receiving a desiccant through which moist gas is passed to remove the moisture from the moist gas;
    fan means for feeding moist gas to said vessel;
    a regeneration gas line for feeding heated regeneration gas to said vessel and through the desiccant to free said moisture picked up by the desiccant from the moist gas;
    heating means for heating the regeneration gas to a predetermined input temperature;
    a control device for controlling the throughput of heated regeneration gas that is fed to the vessel and through the desiccant;
    an exhaust regeneration gas line for receiving the regeneration gas that is passed through the desiccant within the vessel, said exhaust regeneration gas line being open to the atmosphere;
    temperature sensing means for measuring the temperature of the exhaust regeneration gas including a sensor positioned to detect the temperature of the exhaust regeneration gas,
    wherein said sensor is connected with said control device for adjusting the throughput of the regeneration gas that is input to the vessel through the regeneration gas line, while maintaining the temperature of the heated regeneration gas at said predetermined temperature, until the temperature of the exhaust regeneration gas reaches a predetermined exhaust gas temperature.

12. Apparatus according to claim 11, wherein said control device is a valve having a controllable gas flow area.

13. Apparatus according to claim 12, wherein said vessel is a rotor which is driven by a motor so as to rotate.

14. Apparatus according to claim 13, wherein the speed of the motor is controllable as a function of the flow area of the valve.

15. Apparatus according to claim 12 wherein said regeneration gas line is an outlet line of said heating means and said valve is situated in a feed line to said heating means.

16. Apparatus according to claim 15 further comprising a heat exchanger arranged in the feed line to the heating means, through which heat exchanger the regeneration exhaust gas line passes.

17. Apparatus according to claim 11, wherein said control device is a fan which feeds said regeneration gas to the desiccant and has a controllable rotary speed.

18. Apparatus according to claim 17 wherein said vessel is a rotor which is driven by a motor so as to rotate the rotor and wherein the speed of the motor is controllable as a function of the speed of the fan which feeds regeneration gas to the desiccant within the vessel.

19. Apparatus according to claim 11 wherein said feed line to the heating means, is connected to a branch line from a second feed line conducting the moist gas to the vessel.

20. Apparatus according to claim 19 wherein said branch line is led to a cooling section of the desiccant contained in said rotor.

21. Apparatus according to claim 20 wherein said gas line leaving the cooling section of said rotor is fed to the fan means.

* * * * *